United States Patent
Wu et al.

(10) Patent No.: US 10,491,463 B2
(45) Date of Patent: Nov. 26, 2019

(54) SOFTWARE-DEFINED REALIZATION METHOD BASED ON PROTECTION AND CONTROL SYSTEM FOR INTELLIGENT SUBSTATION

(71) Applicants: Kyland Technology Co., Ltd., Beijing (CN); Nanjing Dianyan Electric Power Automation Co., Ltd., Nanjing, Jiangsu (CN)

(72) Inventors: Yinfu Wu, Jiangsu (CN); Bing Huang, Beijing (CN); Fei Wang, Jiangsu (CN)

(73) Assignees: Kyland Technology Co., Ltd (CN); Nanjing Dianyan Electric Power Automation Co., Ltd. (CN)

( * ) Notice: Subject to any disclaimer, the term of this patent is extended or adjusted under 35 U.S.C. 154(b) by 387 days.

(21) Appl. No.: 15/404,498

(22) Filed: Jan. 12, 2017

(65) Prior Publication Data

US 2018/0091364 A1 Mar. 29, 2018

(30) Foreign Application Priority Data

Sep. 29, 2016 (CN) .......................... 2016 1 0865600

(51) Int. Cl.
*H04L 12/24* (2006.01)
*H02H 7/26* (2006.01)
(Continued)

(52) U.S. Cl.
CPC ......... *H04L 41/0803* (2013.01); *H02H 7/261* (2013.01); *H02J 13/0079* (2013.01);
(Continued)

(58) Field of Classification Search
CPC . H04L 41/0803; H04L 41/0086; H02H 7/261; H02J 3/00; H02J 13/0079;
(Continued)

(56) References Cited

U.S. PATENT DOCUMENTS

2009/0300165 A1* 12/2009 Tuckey .............. G05B 23/0224
  709/224
2012/0123603 A1* 5/2012 Werner .................. H02H 7/261
  700/292
(Continued)

FOREIGN PATENT DOCUMENTS

CN   101789624 A   7/2010
CN   104795897 A   7/2015
(Continued)

OTHER PUBLICATIONS

Jeremy Bourdon, European Search Report, European Patent Application No. EP 16207227, May 11, 2017, 10 pages, European Patent Office, Munich Germany.
(Continued)

*Primary Examiner* — Patrice L Winder
*Assistant Examiner* — Lam H Duong
(74) *Attorney, Agent, or Firm* — Crain, Caton and James

(57) ABSTRACT

The application relates to a software-defined realization method based on a protection and control system for an intelligent substation. According to the application, the intelligent substation adopts a centralized modeling manner of directly adding and updating all of a protection, a measurement and control, an exchange and a telecontrol functions in substation configuration descriptions by taking the whole substation as a modeling object, instead of a decentralized modeling manner of sequentially adding a single physical apparatus and then adding functions of each apparatus adopted by a traditional substation. Since SCD files of the intelligent substation are created based on merging unit and intelligent terminal integrated devices and special functions planned by the intelligent substation, and configuration information of each of the special functions is set in the SCD files of the intelligent substation, an aim of defining the
(Continued)

special functions of the intelligent substation through software is achieved.

13 Claims, 2 Drawing Sheets

(51) Int. Cl.
H02J 13/00 (2006.01)
H02J 3/00 (2006.01)

(52) U.S. Cl.
CPC ............ *H04L 41/0886* (2013.01); *H02J 3/00* (2013.01); *H02J 2003/007* (2013.01); *Y02E 60/723* (2013.01); *Y02E 60/724* (2013.01); *Y02E 60/725* (2013.01); *Y02E 60/76* (2013.01); *Y02E 60/7869* (2013.01); *Y04S 10/16* (2013.01); *Y04S 10/18* (2013.01); *Y04S 10/20* (2013.01); *Y04S 40/128* (2013.01); *Y04S 40/22* (2013.01)

(58) Field of Classification Search
CPC ...... H02J 2003/007; Y02E 60/723–725; Y02E 60/76; Y02E 60/7869; Y04S 10/16; Y04S 10/18; Y04S 10/20; Y04S 40/128; Y04S 40/22
USPC .......................................................... 709/220
See application file for complete search history.

(56) References Cited

U.S. PATENT DOCUMENTS

| 2012/0239170 | A1* | 9/2012 | Kulathu ............. G05B 19/0426 700/83 |
| 2013/0096695 | A1* | 4/2013 | Meyer ................. H04L 41/0843 700/2 |
| 2014/0012523 | A1* | 1/2014 | Min ...................... G01R 31/327 702/58 |
| 2015/0074260 | A1* | 3/2015 | Anand B.S. ............ H04L 12/10 709/224 |
| 2015/0294037 | A1* | 10/2015 | Caird .................. G06F 17/5004 703/1 |
| 2015/0341207 | A1* | 11/2015 | Ma ........................ H04L 12/413 709/220 |
| 2019/0029074 | A1* | 1/2019 | Inoue ..................... H04L 12/66 |

FOREIGN PATENT DOCUMENTS

| CN | 104795897 B | 8/2016 |
| EP | 2688251 A1 | 1/2014 |

OTHER PUBLICATIONS

IEC, Substation Configuration Language, XP055346017, Aug. 31, 2006, 14 pages, URL:http://cimug.ucaiug.org/Harmonization Documents/EPRI Harmonization Project Notes and Minutes/IEC TC57 Substation Configuration Language Summary.pdf.

\* cited by examiner

SOFTWARE-DEFINED REALIZATION METHOD BASED ON PROTECTION AND CONTROL SYSTEM FOR INTELLIGENT SUBSTATION

CROSS-REFERENCE TO RELATED APPLICATIONS

This application claims priority to Chinese patent application No. 201610865600.3, filed on Sep. 29, 2016, which is incorporated by reference herein in its entirety.

TECHNICAL FIELD

Embodiments of the disclosure relate to the technical field of intelligent substations, and in particular relate to a software-defined realization method based on a protection and control system for an intelligent substation.

BACKGROUND

An intelligent substation is a substation having primary and secondary devices of the substation as intelligent objects, and capable of realizing information sharing and interoperation by standardizing intelligent information based on a high-speed network communication platform and also capable of realizing automation functions such as measurement and monitoring, control and protection, information management and the like based on network data.

In the related art, a configuration process of the intelligent substation is as follows: each intelligent electronic device (IED) is modeled separately, and each IED is provided with an IED capability description (ICD) file. The ICD file of each IED is imported into a substation configuration description (SCD) configuration tool for conducting unified instance configuration, thereby generating a SCD (substation configuration description) file of the whole intelligent substation. Then, through each IED, the SCD file is downloaded locally and contents related to the device are parsed to form an instantiation file of the device, that is, a configured IED description (CID) file.

The above configuration method of an intelligent substation is a configuration method of defining functions based on apparatuses, that is, firstly adding a physical apparatus, then conducting an instantiation configuration in the SCD configuration tool and generating corresponding functions of the physical apparatus. For example, when functions of a certain physical apparatus are changed or it is required to add a bay due to scale enlargement of the substation and further required to add apparatuses, the ICD file of the physical apparatus needs to be imported into the SCD configuration tool firstly, subjected to an instance configuration to regenerate the SCD file of the whole intelligent substation, and then downloaded locally by each physical apparatus to form a CID file. Particularly for apparatuses on a bay level, because each protection apparatus and each measurement and control apparatus are modeled separately and there are numerous secondary devices, the above configuration process needs to be repeatedly conducted in the configuration method provided in the related art when adding or updating the secondary devices. Therefore, the configuration process is complicated and highly centralized measurement and control and protection needs of the intelligent substation cannot be met.

SUMMARY

In view of this, embodiments of the disclosure provide a software-defined realization method based on a protection and control system for an intelligent substation, so as to solve the technical problems that the configuration process of the configuration method provided in the related art is complicated and highly centralized measurement and control and protection needs of the intelligent substation cannot be met.

Embodiments of the disclosure provide a software-defined realization method based on a protection and control system for an intelligent substation. Merging unit and intelligent terminal integrated devices for all bays in an intelligent substation are directly accessed to transport ports on an intelligent power server. The transport ports and the merging unit and intelligent terminal integrated devices are in a relationship of one-to-one correspondence, the intelligent substation. The intelligent substation adopts a centralized modeling manner of adding and updating all of a protection function, a measurement and control function, an exchange function and a telecontrol function in substation configuration descriptions by taking the whole intelligent substation as a modeling object. The method includes:

through a SCD file configuration tool, creating the SCD files of the intelligent substation based on the merging unit and intelligent terminal integrated devices and each of special functions planned by the intelligent substation, and setting configuration information of each special function in the SCD files of the intelligent substation, each of the special functions of the intelligent substation is set according to application scenarios of the intelligent substation;

generating configured intelligent electronic device description (CID) files of the intelligent power server, by the intelligent power server, based on the SCD files of the intelligent substation;

parsing the CID files of the intelligent power server by the intelligent power server to obtain the configuration information of each of the special functions; and realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices.

According to the software-defined realization method based on a protection and control system for an intelligent substation provided by embodiments of the disclosure, the intelligent substation takes the whole intelligent substation as the modeling object for performing modeling with respect to each special function, and the special functions therein can replace the secondary devices in the related art to perform measurement and control, protection, exchange and telecontrol. Specifically, the SCD files of the intelligent substation can be created by the SCD file configuration tool based on the merging unit and intelligent terminal integrated devices and each special function planned by the intelligent substation, and the configuration information of each special function is set in the SCD files of the intelligent substation. The intelligent power server generates the CID files of the intelligent power server based on the SCD files of the intelligent substation and parses the SCD files to obtain the configuration information of each special function; and the intelligent power server realizes all of the measurement and control, protection, exchange and telecontrol functions in the intelligent substation based on the configuration information of each special function and the received SV messages and GOOSE messages transmitted by the merging unit and intelligent terminal integrated devices. When some special functions of the intelligent substation are updated, configuration information related to the updated special functions can be modified in the SCD files of the intelligent substation, and process level virtual terminators of the updated special functions are associated in the SCD files of the intelligent substation; or, with the increase of the scale of the intelligent substation, when a special function of the intelligent substation is added, configuration information related to the added special functions can be set in the SCD files of the intelligent substation, and process level virtual terminators of the increased special functions are associated in the SCD files of the intelligent substation. Compared with updating functions of the secondary devices in the related art or the configuration process when the scale of the intelligent substation is increased, the configuration process of the disclosure is simple, and highly centralized measurement and control and protection needs of the intelligent substation can be met. Because the SCD files of the intelligent substation are created based on the merging unit and intelligent terminal integrated devices and the special functions planned by the intelligent substation, and the configuration information of each special function is set in the SCD files of the intelligent substation, an aim of defining the functions of the intelligent substation by software is achieved, instead of a manner of adding the special functions of the intelligent substation by adding physical apparatuses.

BRIEF DESCRIPTION OF DRAWINGS

In order to more clearly describe the technical solution of exemplary embodiments of the disclosure, the drawings to be used in descriptions of embodiments are simply introduced below. Apparently, the introduced drawings are only drawings of a part of embodiments to be described in the disclosure, but not all of drawings. Those ordinary skilled in the art may obtain other drawings according to the drawings without paying creative work.

DETAILED DESCRIPTION

Figure 1:
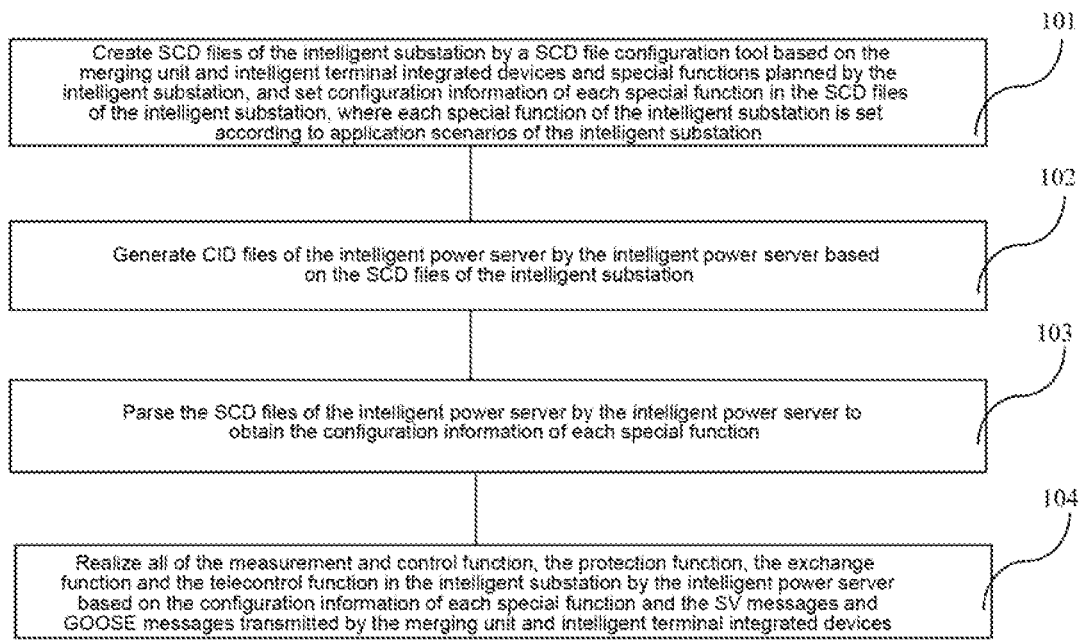
FIG. 1 is a schematic flow chart illustrating a software-defined realization method based on a protection and control system for an intelligent substation provided by embodiment I of the disclosure.

The disclosure is further described below in details by combining the drawings and embodiments. It should be understood that, specific embodiments described herein are only used for illustrating the disclosure, not limiting the disclosure. In addition, it should be noted that, in order to conveniently describe, only a part of structures related to the disclosure, but not all of structures, are illustrated in the drawings.

It should be mentioned that, some exemplary embodiments are described to serve as processing or methods of flow chart description before the exemplary embodiments are discussed in details. Although various operations (or steps) are described into sequential processing in the flow chart, many operations therein can be implemented concurrently, concomitantly or simultaneously. In addition, a sequence of the various operations can be rearranged. The processing can be ended when the operations are completed, however, the processing may also include additional steps which are not included in the drawings. The processing can correspond to methods, functions, procedures, subroutines, subprograms and the like.

Embodiment I

FIG. 1 is a schematic flow chart illustrating a software-defined realization method based on a protection and control system for an intelligent substation provided by the embodiment I of the disclosure.

In the disclosure, the merging unit and intelligent terminal integrated devices for all bays in an intelligent substation are directly accessed to transport ports on the intelligent power server. Each merging unit and intelligent terminal integrated device is accessed to one of transport ports on the intelligent power server through an embedded high-bandwidth switched communication network. The intelligent power server collects the process level data in real time in a manner of accessing each merging unit and intelligent terminal integrated device to one of the transport ports on the intelligent power server through the embedded high-bandwidth switched communication network, performs real-time data processing on the collected process level data, so as to realize all the protection and measurement and control over the primary devices connected to the merging unit and intelligent terminal integrated devices. Specifically, the embedded high-bandwidth switched communication network may be a controller area network (CAN) bus, a field Internet protocol (IP) bus, a Modbus bus, a process field bus (Profibus), a highway addressable remote transducer (HART) open communication protocol bus, a foundation field (FF) bus or an optical fiber.

The transport ports on the intelligent power server and the merging unit and intelligent terminal integrated devices are in a relationship of one-to-one correspondence, the intelligent substation, that is, the intelligent power server is connected to one of the merging unit and intelligent terminal integrated devices merely through one of the transport ports, and each merging unit and intelligent terminal integrated device is merely accessed to one of the transport ports of the intelligent power server.

Illustratively, each merging unit and intelligent terminal integrated device is accessed to one transport port on the intelligent power server 20 merely through one physical link. Specifically, each merging unit and intelligent terminal integrated device is connected to one transport port of the intelligent power server merely through a pair of optical fibers. The transport port of the intelligent power server includes a reception port and a transmission port. Each merging unit and intelligent terminal integrated device is accessed to the reception port of one of the transport ports on the intelligent power server through one optical fiber, and the merging unit and intelligent terminal integrated device is accessed to the transmission port of the transport port on the intelligent power server through another optical fiber. The intelligent power server collects the process level data (e.g., the SV messages and GOOSE messages transmitted by the merging unit and intelligent terminal integrated devices) in real time merely through one physical link, and processes the process level data collected in real time in real time, so as to realize all the protection and measurement and control over the primary devices connected to the merging unit and intelligent terminal integrated devices.

Figure 2:
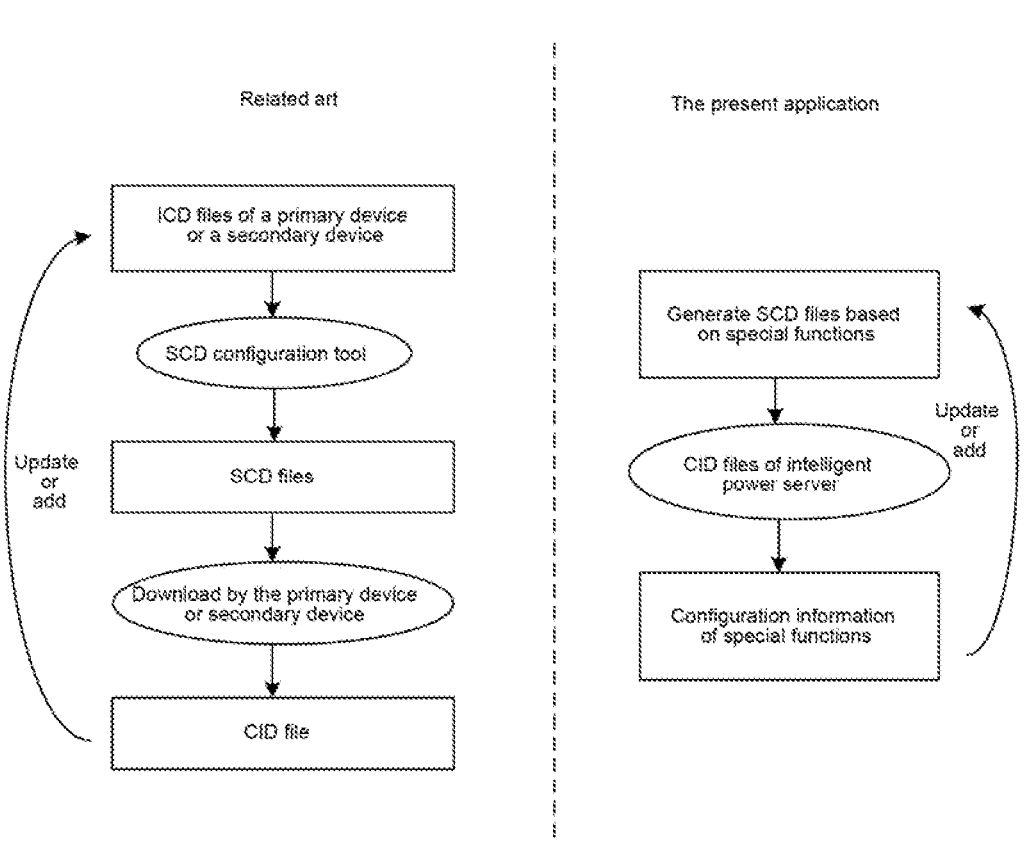
FIG. 2 is contrastive schematic diagram illustrating a centralized modeling manner of the intelligent substation provided by embodiments of the disclosure and an existing decentralized modeling manner.

As shown in FIG. 2, the intelligent substation provided by embodiments of the disclosure adopts a centralized modeling manner of directly adding and updating all of the protection function, the measurement and control function, the exchange function and the telecontrol function in substation configuration descriptions by taking the whole intelligent substation as a modeling object. When new special functions need to be designed with respect to new bays due to scale enlargement of the substation, or when the existing special functions of the substation need to be updated, configuration information of corresponding special functions is added or updated in the SCD files. However, according to the existing decentralized modeling manner of the substation, individual physical apparatus is added, and then functions of each physical apparatus are added. In this way, there are numerous secondary devices, and the ICD files of each secondary device need to be integrated and instantiated to generate SCD files, then contents related to the apparatus, that is the CID files, in the SCD files are downloaded to the apparatus by an apparatus manufacturer through a special tool. That is to say, the configuration process is complicated and tedious.

As shown in FIG. 1, the method includes the following steps:

In step 101, the SCD files of the intelligent substation are created by a SCD file configuration tool based on the merging unit and intelligent terminal integrated devices and special functions planned by the intelligent substation, and configuration information of each special function is set in the SCD files of the intelligent substation. Each special function of the intelligent substation is set according to application scenarios of the intelligent substation.

The number of bays of a whole substation and the number of merging unit and intelligent terminal integrated devices for each bay need to be planned when the intelligent substation is established. Substations in different scales have different numbers of bays. Special functions need to be set according to specific application scenarios of the substation when the intelligent substation is established, and different application scenarios correspond to different special functions. The SCD files of the whole substation will be changed due to changes of the merging unit and intelligent terminal integrated devices and the special functions in the intelligent substation. The special functions can include the measurement and control function, the protection function, the exchange function and the telecontrol function.

Specifically, the configuration information of each special function in the SCD files of embodiments of the disclosure includes one or more of the following information: instance configuration information of the special function, data template information, associated information of the special function and the merging unit and intelligent terminal integrated device, signal description configuration information of the special function, GOOSE signal connection configuration information of the special function, communication network information of the special function and communication parameter configuration information of the special function. Specifically, related configuration information can be set with respect to different types of special functions, that is, the configuration information of each special function can include one or more of the above information.

The instance configuration information is mainly used for setting a specific solution of the special function. For example, with respect to the measurement and control function, the instance configuration information can include a measurement and control instance which describes implementing corresponding control according to the acquired measurement information. With respect to the protection function, the instance configuration information can include a protection instance which describes that under what circumstances will the protection function be started and a specific solution of starting the protection function. The data template information defines a form of a generated report block with respect to special provisions of data collection and data reporting. For example, a corresponding report block needs to be generated based on the data template information when the telecontrol function is implemented. Other pieces of configuration information mainly relate to communication parameters of each special function, as well as how to communicate between the special functions and the merging unit and intelligent terminal integrated devices, between the special functions and devices on the station level, between the special functions and a network analyzer or a fault recorder and among the special functions, so as to perform data transmission.

In step 102, CID files of the intelligent power server are generated by the intelligent power server based on the SCD files of the intelligent substation.

In the step, the CID files of the intelligent power server are generated by the intelligent power server based on the SCD files of the intelligent substation, where the SCD files of the intelligent substation are created based on the merging unit and intelligent terminal integrated devices and special functions planned by the intelligent substation, and configuration information of each special function is set in the SCD files of the intelligent substation.

In step 103, the CID files of the intelligent power server are parsed by the intelligent power server to obtain configuration information of each special function. In the step, on the basis of the configuration information of each special function set in the SCD files, the intelligent power server can further obtain the configuration information of each special function. Specifically, the configuration information can include one or any combination of the following information: instance configuration information of the special function, data template information of the special function, communication parameters of the special function, communication configuration information among the special functions, communication configuration information between the special functions and the devices on the station level, communication configuration information between the special functions and the merging unit and intelligent terminal integrated devices, and communication configuration information between the special functions and the network analyzer or the fault recorder.

In step 104, based on the configuration information of each special function and the SV messages and GOOSE messages transmitted by the merging unit and intelligent terminal integrated devices, all of the measurement and control function, the protection function, the exchange function and the telecontrol function in the intelligent substation are realized by the intelligent power server.

The SCD files of the intelligent substation are created based on the merging unit and intelligent terminal integrated devices and special functions planned by the intelligent substation. The configuration information of each special function is defined in the SCD files of the intelligent substation. The intelligent power server generates the CID files of the intelligent power server based on the SCD files of the intelligent substation and parses the above CID files so as to obtain the configuration information of each special function. When in operation, the intelligent power server performs measurement and control and various protections on the primary devices based on the configuration information of the special functions and the received SV messages and GOOSE messages.

Specifically, the measurement and control function in the disclosure refers to realization of measurement and control over the primary devices connected to the merging unit and intelligent terminal integrated devices for all bays of the intelligent substation and the merging unit and intelligent terminal integrated devices. The protection function in the disclosure refers to realization of protection of the primary devices connected to the merging unit and intelligent terminal integrated devices for all bays of the intelligent substation and the merging unit and intelligent terminal integrated devices. The telecontrol function in the disclosure is to collect the measurement and control information and protection information generated in the measurement and control process and the protection process, transmit the measurement and control information and the protection information to an operator workstation and perform a remote control on the primary devices according to instructions from the operator workstation. The exchange function in the disclosure refers to realization of data exchange between the merging unit and intelligent terminal integrated devices and the devices on the process level, data exchange between the intelligent power server and the devices on the process level, data exchange between the intelligent power server and the devices on the station level, data exchange among the devices on the process level and data exchange among the devices on the station level.

According to the software-defined realization method based on the protection and control system for an intelligent substation provided by embodiments of the disclosure, the intelligent substation takes the whole intelligent substation as a modeling object for performing centralized modeling with respect to each special function. The special functions can replace the secondary devices at the bay level in the related art to implement the measurement and control, protection, exchange and telecontrol. Specifically, based on the merging unit and intelligent terminal integrated devices and each special function planned by the intelligent substation, the SCD files of the intelligent substation can be created by the SCD file configuration tool, and the configuration information of each special function is set in the SCD files of the intelligent substation; the intelligent power server generates the CID files of the intelligent power server based on the SCD files of the intelligent substation and further parses the CID files to obtain the configuration information of each special function; and based on the configuration information of each special function and the SV messages and GOOSE messages transmitted by the merging unit and intelligent terminal integrated devices, all of the measurement and control, protection, exchange and telecontrol functions in the intelligent substation are realized by the intelligent power server.

In the present disclosure, instead of adopting a manner of adding the functions of the intelligent substation through adding physical apparatuses, an aim of defining the functions of the intelligent substation through software is achieved by creating the SCD files of the intelligent substation based on the merging unit and intelligent terminal integrated devices and the special functions planned by the intelligent substation and setting the configuration information of each special function in the SCD files of the intelligent substation.

The above method can further include: when some special functions of the intelligent substation are updated, the configuration information related to the updated special functions can be modified in the SCD files of the intelligent substation, and process level virtual terminators of the updated special functions are associated in the SCD files of the intelligent substation, please refer to descriptions of subsequent embodiments for the specific modification manner. Alternatively, the above method can further include: with the increase of the scale of the intelligent substation, when a special function of the intelligent substation is added, configuration information related to the added special function can be set in the SCD files of the intelligent substation, and process level virtual terminators of the added special functions are associated in the SCD files of the intelligent substation, please refer to the descriptions of the subsequent embodiments for the specific setting manner. Compared with updating the functions of the secondary devices or the configuration process when the scale of the intelligent substation is increased in the related art, the configuration process of the present disclosure is simple, and highly centralized measurement and control and protection needs of the intelligent substation can be met.

Associating the process level virtual terminators of the updated or added special functions in the SCD files of the intelligent substation can be specifically as follows: associating virtual terminators and external input terminals of the special functions in the SCD files.

Embodiment II

In the above embodiment I of the disclosure, in the step 101, the SCD files of the intelligent substation are created by the SCD file configuration tool based on the merging unit and intelligent terminal integrated devices and special functions planned by the intelligent substation. Illustratively, the different special functions are set for different application scenarios of the intelligent substation. The SCD files can be created in two modes. Specifically, the first mode is as follows: the SCD file configuration tool directly sets the configuration information of each special function and the configuration information of each merging unit and intelligent terminal integrated device in the SCD files, and associates the process level virtual terminators. When demands of the intelligent substation are changed and new special functions need to be added or the existing special functions need to be updated, the SCD file configuration tool directly adds or updates configuration information of corresponding special functions in the SCD files, and directly associates the process level virtual terminators of the added or updated special functions in the SCD files of the intelligent substation. The intelligent power server generates the CID files of the intelligent power server based on the SCD files of the intelligent substation. When in operation, the intelligent power server parses the CID files of the intelligent power server to obtain the configuration information of each special function, and realizes all of the measurement and control, protection, exchange and telecontrol functions in the intelligent substation based on the configuration information of each special function and the SV messages and GOOSE messages transmitted by the merging unit and intelligent terminal integrated devices. The second realization mode is as follows: the ICD files of the intelligent power server are created firstly, and each special function is set in the ICD files of the intelligent power server; then, the SCD file configuration tool generates the SCD files of the whole intelligent substation based on the ICD files of the intelligent power server and the ICD files of the merging unit and intelligent terminal integrated devices, and the process level virtual terminators are associated in the SCD files. The intelligent power server generates the CID files of the intelligent power server based on the SCD files of the intelligent substation. When in operation, the intelligent power server parses the CID files of the intelligent power server to obtain the configuration information of each special function, so as to realize all of the measurement and control, protection, exchange and telecontrol functions in the intelligent substation based on the configuration information of each special function and the SV messages and GOOSE messages transmitted by the merging unit and intelligent terminal integrated devices. When the demands of the intelligent substation are changed and new special functions need to be added or the existing special functions need to be updated, corresponding special functions are added or updated on the ICD files of the intelligent power server; then the SCD file configuration tool regenerates the SCD files of the whole intelligent substation based on the ICD files of the intelligent power server and the ICD files of the merging unit and intelligent terminal integrated devices; and the process level virtual terminators are associated in the SCD files.

In addition, referring to the description in the above embodiment I, the configuration information of each special function in the SCD files can include one or any combination of the following information: instance configuration information of the special function, data template information of the special function, associated information of the special function and the merging unit and intelligent terminal integrated device, signal description configuration information of the special function, GOOSE signal connection configuration information of the special function, communication network information of the special function and communication parameter configuration information of the special function. However, according to embodiments of the disclosure, when a special function is added in the intelligent substation, the step of setting configuration information related to the added special functions in the SCD files of the intelligent substation is specifically as follows: one or any combination of the instance configuration information of the added special function, the data template information of the added special function, the associated information of the added special function and the merging unit and intelligent terminal integrated device, the signal description configuration information of the added special function, the GOOSE signal connection configuration information of the added special function, the communication network information of the added special function and the communication parameter configuration information of the added special function is set in the SCD files of the intelligent substation.

In addition, when the special functions are updated in the intelligent substation, the step of modifying the configuration information related to the updated special functions in the SCD files of the intelligent substation can be specifically as follows: one or any combination of the instance configuration information of the updated special functions, the data template information of the updated special functions, the associated information of the updated special functions and the merging unit and intelligent terminal integrated devices, the signal description configuration information of the updated special functions, the GOOSE signal connection configuration information of the updated special functions, the communication network information of the updated special functions and the communication parameter configuration information of the updated special functions is modified in the SCD files of the intelligent substation.

In embodiment II of the disclosure, when a special function is added, the SCD files of the intelligent substation are changed and configuration information related to the added special function is set, and then the information CID files of the intelligent power server are further generated based on the SCD files of the intelligent substation, and the CID files of the intelligent power server are parsed to obtain the configuration information of the added special function.

As a result, the intelligent power server can realize the newly added special function in the intelligent substation based on the configuration information of the newly added special function and the SV messages and GOOSE messages transmitted by the merging unit and intelligent terminal integrated devices. Further, when the special functions are updated, the configuration information related to the updated special functions is modified in the SCD files of the intelligent substation, then the information CID files of the intelligent power server are generated based on the SCD files of the intelligent substation, and the CID files of the intelligent power server are parsed to obtain the configuration information of the updated special functions. As a result, the intelligent power server can realize the updated special functions in the intelligent substation based on the updated configuration information and the SV messages and GOOSE messages transmitted by the merging unit and intelligent terminal integrated devices.

Embodiment III

In the above embodiments of the disclosure, in order to realizes the function thereof, each special function, particularly the measurement and control function and the protection function, needs to communicate with the merging unit and intelligent terminal integrated devices so as to acquire the subscribed SV/GOOSE data, while the merging unit and intelligent terminal integrated devices are generally directly accessed to the transport ports on the intelligent power server, and each transport port is in one-to-one correspondence to the merging unit and intelligent terminal integrated devices. Therefore, the special functions can correspond to at least one transport port, and data transmission is performed between the special functions and the merging unit and intelligent terminal integrated devices through corresponding at least one transport port. Specifically, the communication configuration information between the special functions and the merging unit and intelligent terminal integrated devices has been defined in the configuration information in the above embodiments, and then the communication configuration information between the special functions and the merging unit and intelligent terminal integrated devices defined in the configuration information specifically may be a corresponding relationship between the special functions and the transport ports.

After the corresponding relationship between the special functions and the transport ports on the intelligent power server is established, with respect to the measurement and control function, in the step 104 of the above embodiment I, the step of, based on the configuration information of each special function and the SV messages and GOOSE messages transmitted by the merging unit and intelligent terminal integrated devices, realizing all of the measurement and control, protection, exchange and telecontrol functions in the intelligent substation by the intelligent power server can include:

through an application software for realizing the measurement and control function, acquiring the SV/GOOSE data subscribed from a specified merging unit and intelligent terminal integrated device from corresponding transport port based on the corresponding relationship between the measurement and control function and the transport port defined in the configuration information of the measurement and control function, and processing the subscribed SV/GOOSE data, so as to measure and control the primary devices connected to the specified merging unit and intelligent terminal integrated device.

With respect to the protection function, in the step 104 of the above embodiment I, the step of realizing all of the measurement and control, protection, exchange and telecontrol functions in the intelligent substation by the intelligent power server based on the configuration information of each special function and the SV messages and GOOSE messages transmitted by the merging unit and intelligent terminal integrated devices can include:

through an application software for realizing the protection function, acquiring the SV/GOOSE data subscribed from the specified merging unit and intelligent terminal integrated device from corresponding transport port based on the corresponding relationship between the protection function and the transport port defined in the configuration information of the protection function, and processing the subscribed SV/GOOSE data, so as to protect the primary devices connected to the specified merging unit and intelligent terminal integrated device.

Further, with respect to the telecontrol function, in the step 104 of the above embodiment I, the step of realizing all of the measurement and control, protection, exchange and telecontrol functions in the intelligent substation by the intelligent power server based on the configuration information of each special function and the SV messages and GOOSE messages transmitted by the merging unit and intelligent terminal integrated devices can include:

through an application software for realizing the telecontrol function, based on a report block defined in the configuration information of the telecontrol function, collecting report information generated by the measurement and control function in the measurement and control process and/or by the protection function in the protection process, and converting media access control addresses of the merging unit and intelligent terminal integrated devices in the report information to Internet protocol addresses of the merging unit and intelligent terminal integrated devices, and transmitting the report information to the devices on the station level. Please refer to the data template information defined in the configuration information of the telecontrol function for the report block.

Further, with respect to the exchange function, in the step 104 of the above embodiment I, the step of realizing all of the measurement and control, protection, exchange and telecontrol functions in the intelligent substation by the intelligent power server based on the configuration information of each special function and the SV messages and GOOSE messages transmitted by the merging unit and intelligent terminal integrated devices can include:

through an application software for realizing the exchange function, based on the communication configuration information of the network analyzer or the fault recorder defined by the exchange function, receiving the sampled value messages or generic object oriented substation event messages from each merging unit and intelligent terminal integrated device and forwarding the received sampled value messages or generic object oriented substation event messages to the network analyzer or the fault recorder.

FIG. 2 is contrastive schematic diagram illustrating a centralized modeling manner of the intelligent substation provided by embodiments of the disclosure and an existing decentralized modeling manner. As shown in FIG. 2, according to the decentralized modeling manner in the related art, the ICD files of all intelligent electronic devices in a substation system need to be acquired firstly and then are transmitted to the SCD configuration tool; the SCD configuration tool performs instantiation configuration and generates the SCD files of the whole substation system, then each intelligent electronic device in the substation system downloads the above SCD files and generates its own CID files. However, the modeling manner provided by the disclosure is a centralized modeling manner based on the special functions. Firstly, the SCD files of the intelligent substation are created based on the special functions, and configuration information of each special function is included in the SCD files. Then, the CID files of the intelligent power server are generated based on the SCD files of the intelligent substation and parsed so as to acquire the configuration information of each special function. As can be seen from the above, the process of the centralized modeling manner provided by embodiments of the disclosure is simpler. Particularly when a function needs to be updated or added in the substation, the above steps need to be repeatedly executed in the decentralized modeling manner provided in the related art, that is, the ICD files of each intelligent electronic device are recollected, instantiation configuration is performed again to generate the SCD files, and finally, the SCD files are downloaded locally by each intelligent electronic device to generate own CID files. However, according to the centralized modeling manner in the disclosure, it only needs to add configuration description information of the new special function in the SCD files of the intelligent substation, or modify the configuration description information of the updated special functions, then the CID files of the intelligent power server are generated and parsed so as to acquire the configuration information of the new special functions or the configuration information of the updated special functions. Therefore, the disclosure provides a simpler process of adding or updating functions.

Please note that the intelligent terminals in the merging unit and intelligent terminal integrated devices are intelligent assemblies. The intelligent terminals are connected to primary devices, such as a circuit breaker, knife switch and main transformer and the like, through cables, and connected to secondary devices for protecting, measuring and controlling and the like through optical fibers, so as to achieve measurement function, control function and the like over the primary devices. Specifically, the intelligent terminals mainly have the following functions:

receiving control instructions for trip protection and tripping;

receiving and executing opening/closing control instructions from a measuring and control device;

uploading position signals of knife switches; collecting and uploading temperature data/humidity data.

It should be noted that, the above descriptions are only exemplary embodiments and used technical principles of the disclosure. Those skilled in the art may understand that the disclosure is not limited to specific embodiments herein, and those skilled in the art may carry out various apparent modifications, readjustments and replacements without departing from the protection scope of the disclosure. Therefore, although the disclosure is described in details through above embodiments, the disclosure is not limited to above embodiments, and also can include more other equivalent embodiments without deviating from the conception of the disclosure, while the scope of the disclosure is determined by the scope of the attached claims.

What is claimed is:

1. A software-defined realization method based on a protection and control system for an intelligent substation, wherein merging unit and intelligent terminal integrated devices for all bays in the intelligent substation are directly accessed to transport ports on an intelligent power server, wherein the transport ports and the merging unit and intelligent terminal integrated devices are in a relationship of one-to-one correspondence, the intelligent substation adopts a centralized modeling manner of adding and updating all of a protection function, a measurement and control function, an exchange function and a telecontrol function in substation configuration descriptions (SCD) files by taking the whole intelligent substation as a modeling object, the method comprises:

through a SCD file configuration tool, creating the SCD files of the intelligent substation based on the merging unit and intelligent terminal integrated devices and each of special functions planned by the intelligent substation, and setting configuration information of each special function in the SCD files of the intelligent substation, wherein each of the special functions of the intelligent substation is set according to application scenarios of the intelligent substation;

generating configured intelligent electronic device description (CID) files of the intelligent power server, by the intelligent power server, based on the SCD files of the intelligent substation;

parsing the CID files of the intelligent power server by the intelligent power server to obtain the configuration information of each of the special functions; and realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices.

2. The method according to claim 1, further comprising: when a special function of the intelligent substation is added, setting configuration information related to the added special function in the SCD files of the intelligent substation, and associating process level virtual terminators of the added special function in the SCD files of the intelligent substation.

3. The method according to claim 1, further comprising: when a special function of the intelligent substation is updated, modifying configuration information related to the updated special function in the SCD files of the intelligent substation, and associating process level virtual terminators of the updated special function in the SCD files of the intelligent substation.

4. The method according to claim 2, wherein the configuration information of each of the special functions set in the SCD files of the intelligent substation comprises one or any combination of the following information: instance configuration information of the special function, data template information of the special function, associated information of the special function and the merging unit and intelligent terminal integrated devices, signal description configuration information of the special function, GOOSE signal connection configuration information of the special function, communication network information of the special function and communication parameter configuration information of the special function;

the step of setting configuration information related to the added special function in the SCD files of the intelligent substation comprises:

setting one or any combination of the following information in the SCD files of the intelligent substation: the instance configuration information of the added special function, the data template information of the added special function, the associated information of the added special function and the merging unit and intelligent terminal integrated devices, the signal description configuration information of the added special function, the GOOSE signal connection configuration information of the added special function, the communication network information of the added special function and the communication parameter configuration information of the added special function.

5. The method according to claim 3, wherein the configuration information of each of the special functions set in the SCD files of the intelligent substation comprises one or any combination of the following information: instance configuration information of the special function, data template information of the special function, associated information of the special function and the merging unit and intelligent terminal integrated devices, signal description configuration information of the special function, GOOSE signal connection configuration information of the special function, communication network information of the special function and communication parameter configuration information of the special function;

the step of modifying configuration information related to the updated special function in the SCD files of the intelligent substation comprises:

modifying one or any combination of the following information in the SCD files of the intelligent substation: the instance configuration information of the updated special function, the data template information of the updated special function, the associated information of the updated special function and the merging unit and intelligent terminal integrated devices, the signal description configuration information of the updated special function, the GOOSE signal connection configuration information of the updated special function, the communication network information of the updated special function and the communication parameter configuration information of the updated special function.

6. The method according to claim 1, wherein the configuration information of each of the special functions obtained by parsing the CID files of the intelligent power server by the intelligent power server comprises one or any combination of the following information:

instance configuration information of the special functions, communication parameters, communication configuration information among the special functions, communication configuration information between the special functions and the merging unit and intelligent terminal integrated devices, and communication configuration information between the special functions and one of a network analyzer and a fault recorder.

7. The method according to claim 1, wherein the special functions correspond to at least one transport port, and the special functions perform data transmission with the merging unit and intelligent terminal integrated devices through corresponding at least one transport port.

8. The method according to claim 7, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the measurement and control function, acquiring SV/GOOSE data subscribed from a specified merging unit and intelligent terminal integrated device from a corresponding transport port according to a corresponding relationship between the measurement and control function and the transport port defined in configuration information of the measurement and control function, and processing the subscribed SV/GOOSE data so as to measure and control a primary device connected to the specified merging unit and intelligent terminal integrated device.

9. The method according to claim 7, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the protection function, acquiring the SV/GOOSE data subscribed from the specified merging unit and intelligent terminal integrated device from the corresponding transport port according to a corresponding relationship between the protection function and the transport port defined in configuration information of the protection function, and processing the subscribed SV/GOOSE data so as to protect the primary device connected to the specified merging unit and intelligent terminal integrated device.

10. The method according to claim 1, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the telecontrol function, according to a report block defined in configuration information of the telecontrol function, collecting report information generated by the measurement and control function in a measurement and control process and/or by the protection function in a protection process, and converting media access control addresses of the merging unit and intelligent terminal integrated devices in the report information to Internet protocol addresses of the merging unit and intelligent terminal integrated devices, and transmitting the report information to devices on a station level.

11. The method according to claim 8, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the telecontrol function, according to a report block defined in configuration information of the telecontrol function, collecting report information generated by the measurement and control function in a measurement and control process and/or by the protection function in a protection process, and converting media access control addresses of the merging unit and intelligent terminal integrated devices in the report information to Internet protocol addresses of the merging unit and intelligent terminal integrated devices, and transmitting the report information to devices on a station level.

12. The method according to claim 9, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the telecontrol function, according to a report block defined in configuration information of the telecontrol function, collecting report information generated by the measurement and control function in a measurement and control process and/or by the protection function in a protection process, and converting media access control addresses of the merging unit and intelligent terminal integrated devices in the report information to Internet protocol addresses of the merging unit and intelligent terminal integrated devices, and transmitting the report information to devices on a station level.

13. The method according to claim 1, wherein the step of realizing, by the intelligent power server, all of the measurement and control function, the protection function, the exchange function and the telecontrol function in the intelligent substation based on the configuration information of each of the special functions and sampled value (SV) messages and generic object oriented substation event (GOOSE) messages transmitted by the merging unit and intelligent terminal integrated devices comprises:

through an application software for realizing the exchange function, according to communication configuration information with the network analyzer or fault recorder defined in the configuration information of the exchange function, receiving the sampled value messages or generic object oriented substation event messages from each of the merging unit and intelligent terminal integrated devices, and forwarding the received sampled value messages or generic object oriented substation event messages to the network analyzer or fault recorder.

* * * * *